United States Patent [19]
Grant

[11] 3,880,088
[45] Apr. 29, 1975

[54] VEHICLE CONTROL SYSTEM AND METHOD

[75] Inventor: Douglas Grant, Akron, Ohio

[73] Assignee: The Goodyear Tire & Rubber Company, Akron, Ohio

[22] Filed: July 23, 1973

[21] Appl. No.: 381,821

Related U.S. Application Data

[63] Continuation-in-part of Ser. No. 345,156, March 26, 1973, abandoned.

[52] U.S. Cl. .................. 104/168; 104/149; 318/91
[51] Int. Cl. .......................................... B61b 13/12
[58] Field of Search........ 104/168, 152, 149, 148 R; 318/91, 211

[56] References Cited
UNITED STATES PATENTS

| | | | |
|---|---|---|---|
| 3,249,065 | 5/1966 | Adams et al. | 104/168 X |
| 3,687,082 | 8/1972 | Burke | 104/152 |
| 3,817,185 | 6/1974 | Eckerman et al. | 104/152 |

*Primary Examiner*—M. Henson Wood, Jr.
*Assistant Examiner*—Randolph A. Reese
*Attorney, Agent, or Firm*—F. W. Brunner; L. A. Germain

[57] ABSTRACT

Acceleration and deceleration control are provided for a vehicle transportation system wherein a plurality of polyphase electric motors in the acceleration and deceleration zones are coupled to rotating drive means in the vehicle pathway to move the vehicles at the synchronous motor speeds. Control circuitry is provided to assign the motors under a particular vehicle to one of a plurality of ramp-generator/inverters that adjust motor speed by frequency control. The motors are sequentially switched as the vehicle moves through the zone and when more than one vehicle is in the zone, each is assigned a separate ramp-generator/inverter.

15 Claims, 6 Drawing Figures

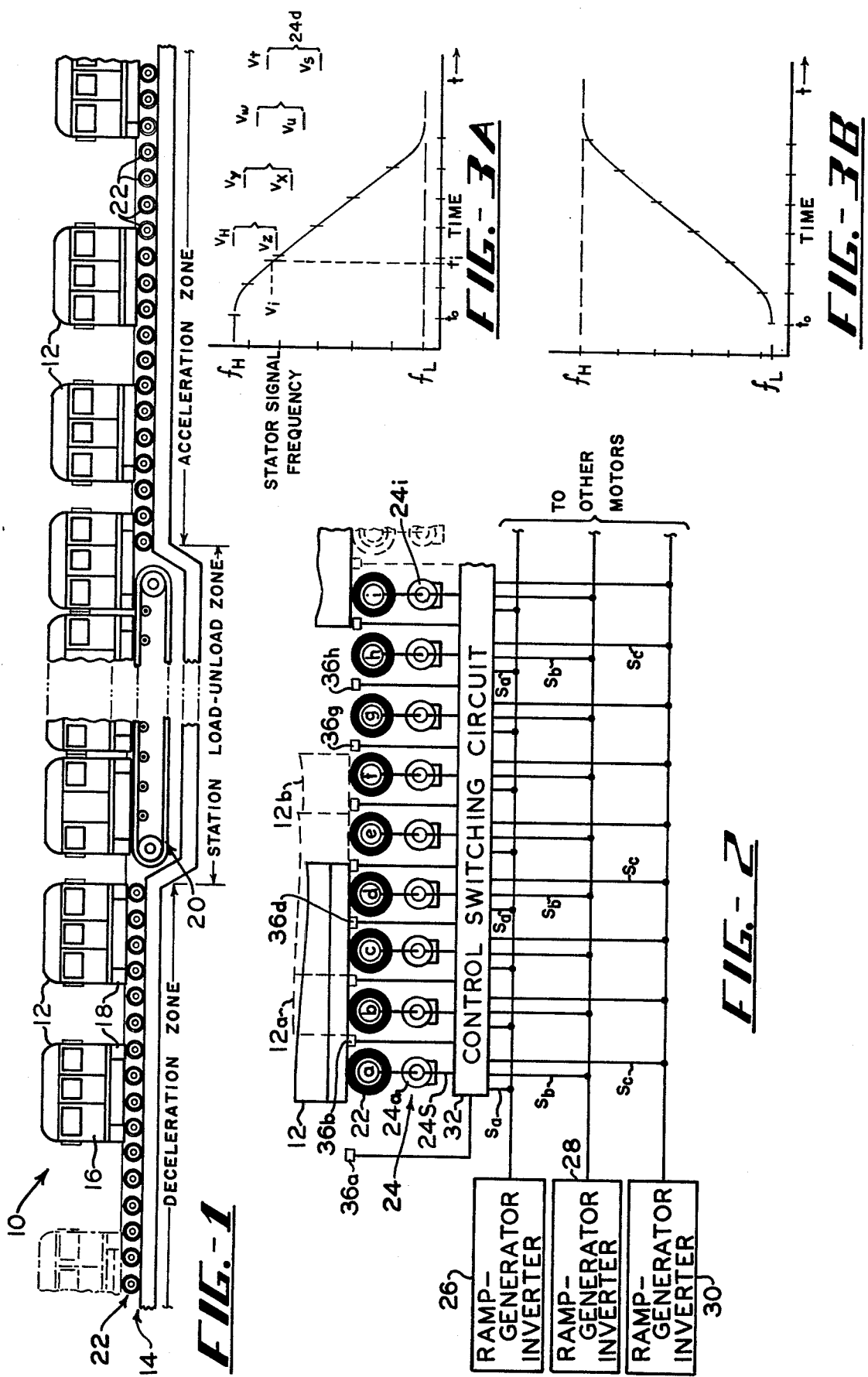

VEHICLE CONTROL SYSTEM AND METHOD

This application is a continuation-in-part of an earlier filed application entitled "Vehicle Control System and Method" and identified by Ser. No. 345,156 and filed Mar. 26, 1973 now abandoned.

BACKGROUND OF THE INVENTION

In the art of conveyor systems, and particularly with respect to passenger conveying systems, it is an important consideration that the moving vehicle make a smooth transition between high-speed interstation and low-speed intrastation zones. This is especially true of systems wherein passengers enter and exit vehicles while they move at low speed within a station zone but at the same relative speed as a moving station platform or walkway because it is imperative that vehicles enter and exit the station zone at equally spaced and regular intervals and as smoothly as possible. Once a vehicle moves through the station zone it enters an acceleration zone wherein it increases in speed until it reaches a threshold level whereupon it is exited into the high-speed zone pathway. In the same manner, upon traversing the high-speed interstation zone, the vehicle exits into a deceleration zone wherein its speed is reduced to the station low-speed threshold and passengers may exit and enter the vehicle safely.

SUMMARY OF THE INVENTION

This invention is directed to vehicle transportation systems and more specifcally to vehicle speed control as applied to the acceleration and deceleration zones of the system.

In the instant invention, a plurality of rotating drive means are situated in the vehicle pathway to engage the vehicle and control its speed in the acceleration and deceleration zones. The drive means are coupled to individual polyphase electric motors with synchronous speed ranges that cover the total speed range from high interstation to low intrastation speed and which are sequentially switched for a particular vehicle throughout the speed transition zone. Switching circuitry is provided that couples a particular ramp-generator/inverter to the motor and drive means wherein a vehicle's speed, upon entering the speed transition zone whether accelerating or decelerating, is goverened by a single ramp-generator/inverter.

DESCRIPTION OF THE DRAWINGS

The features of the invention may best be understood from a consideration of the following description taken in conjunction with the accompanying drawings, in the several figures of which like reference numerals identify like elements, and in which:

FIG. 1 is a schematic side elevational view of a portion of a typical modern passenger conveyor system incorporating the preferred form of the invention for accelerating and decelerating vehicles with portions being broken away to more clearly show the overall arrangement;

FIG. 2 is a general schematic diagram of the acceleration/deceleration control system forming the basic elements of the invention;

FIGS. 3A and 3B are graphical illustrations of motor control-frequency vs. time plots;

DESCRIPTION OF THE PREFERRED EMBODIMENT

Figure 4:
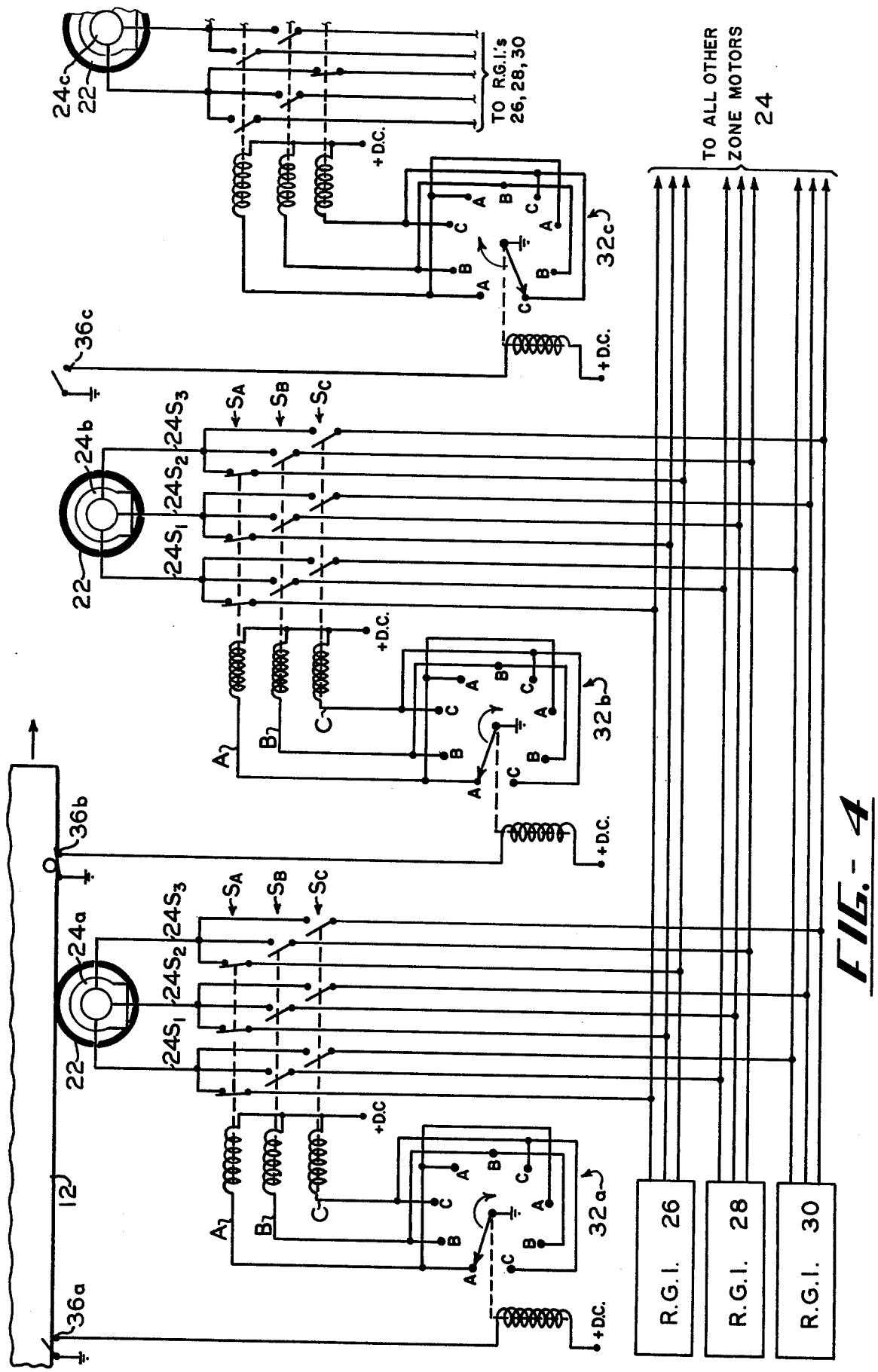
FIG. 4 is a more specific schematic illustrating an electromechanical embodiment of the control and switching system more generally shown in FIG. 2.

Referring to the drawings, there is illustrated in FIG. 1 a typical transportation system generally indicated at 10 for conveying passengers within a plurality of vehicles 12 moving along a pathway 14. The system 10 generally comprises four speed zones that may be designated (1) a high-speed interstation zone (not shown), (2) a deceleration zone, (3) a low-speed intrastation load and unload zone, and (4) an acceleration zone. Systems of this general type are designed to carry high volume passenger traffic between stations and provide a continuous movement of vehicles around a closed system pathway.

The vehicles 12 may be of any design and structure to meet the needs of a particular system. For the purpose of this description, the vehicles are shown having a body portion 16 for enclosing passengers and may be suspended within the pathway 14 by means of a wheeled undercarriage 18 riding on rails or the like within the pathway. The vehicles 12 may as well be suspended from an overhead pathway 14 and, therefore, it is not a requirement of this invention that wheeled undercarriages be provided. Both the high-speed interation and low-speed intrastation zones may have a variety of drive means, for example, linear motors, belts, or the like, and in either case the present invention is designed to provide a smooth transition between the high-speed and low-speed zones regardless of the type of drive means used in either of these zones.

FIG. 1 shows the low-speed station zone as having a constant speed belt drive apparatus 20 that engages the vehicle as it exits the deceleration zone. The engagement may be by totally supporting the vehicles upon the belt or by attachment and pulling the vehicles through the station zone in speed synchronism with a moving platform or walkway.

When the vehicles 12 enter either of the transition zones for deceleration or acceleration, they are individually accepted by the control system (generally illustrated in FIG. 2) and gradually decelerated or accelerated to a speed to substantially match the drive speed of the zone which they are entering such that no jerking of the vehicle is evident when changing speed zones. In FIG. 1, the transition zones are shown having a plurality of drive means 22 positioned in the pathway 14 such that a vehicle entering the zone is under control of the drive means. For the purpose of this description the drive means 22 are shown as rubber-tired wheels, however, it is anticipated that other means such as rollers, drums, belts, etc. may be used as well, depending on the type of vehicle engagement desired.

Each of the drive means 22 is coupled to a polyphase electric motor 24 that effects rotation of the drive means at the motor synchronous speed. FIG. 2 generally illustrates the speed control system of the invention and FIG. 4 shows a more specific schematic of one embodiment. Referring to FIG. 2, a vehicle 12 is shown in engagement with a plurality of drive means 22 that have their rotation effected by motors 24. Each motor 24a, 24b, 24c, etc. rotates at a speed determined by a ramp-generator/ inverter (hereinafter referred to as RGI), which speed is effected by a change in the frequency of the three-phase currents fed to the stator windings 24S. The motor speed is directly proportional to the signal frequency and this type of control is well known and understood by persons skilled in the art of electric motor control.

Each motor 24 may be controlled by any one of a series of RGI's 26, 28, and 30 as determined by a switching control circuit 32. The three-phase stator windings 24S are connected to each RGI through the switching control unit 32 that assigns a particular vehicle 12 to one of the RGI's by virtue of a series of switches or signal sources 36a, 36b, etc. which will be more fully understood with reference to FIG. 4.

Figure 5:
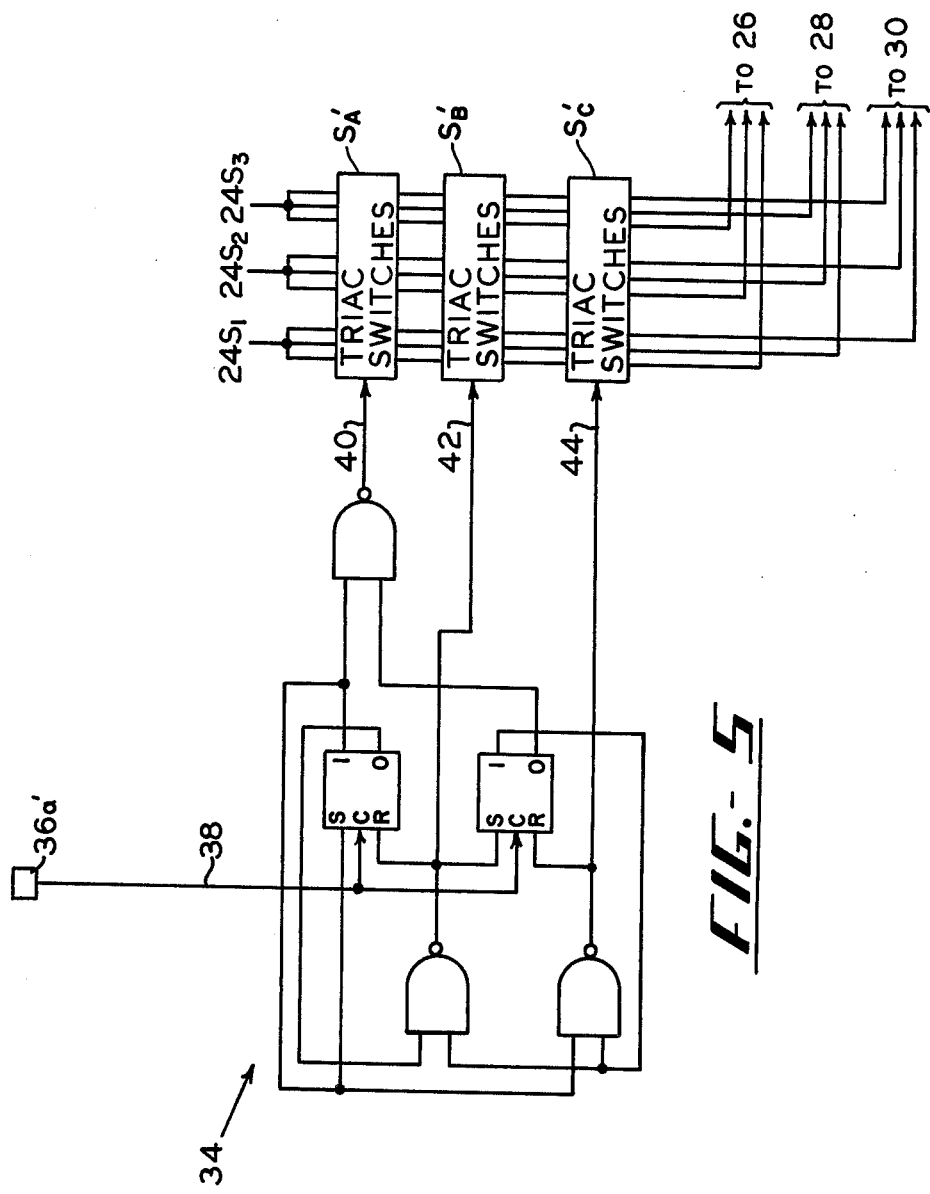
FIG. 5 is a diagramatic schematic of logic circuitry that may replace the electromechanical switching embodiment shown in FIG. 4.

FIG. 4 is a simplified schematic of an electromechanical switching control circuit that may be used to meet the requirements of the invention and it is shown here for the purpose of describing the operational features of the invention. It is recognized that advanced solid state logic switching circuitry as illustrated in FIG. 5 may be applied to this portion of the invention to provide increased switching speed, reliability, and compactness and it is considered that the invention is not limited to the embodiments shown but by the scope of the appended claims.

In the operation of deceleration, a vehicle 12 enters the zone traveling at a speed $V_H$ determined by the high-speed zone. FIGS. 3A and 3B graphically illustrate the time rate of frequency change for the three-phase stator signals wherein a frequency $f_H$ corresponds to the highest speed $V_H$ and a frequency $f_L$ corresponds to the lowest speed $V_L$ for the high and low speed zones, respectively. Upon entering the deceleration zone at a speed corresponding to $f_H$, the vehicle 12 energizes switch 36a which in turn energizes a control switching circuit 32a for motor 24a. The switching circuit 32a is shown in FIG. 4 as a stepping switch that moves to position A providing closure of switches $S_A$ and connection of the three-phase stator windings $24s_1$, $24s_2$, and $24s_3$ to RGI 26. As the vehicle 12 advances within the zone, it energizes consecutive switches 36b, 36c, etc. that sequentially connect motors 24b, 24c, etc. to RGI 26 and all such motors connected are under the control of RGI 26. In this arrangement, all of the motors under the control of a single RGI have, at any instant of time $t$, the same speed. As illustrated in FIG. 2, when the vehicle advances to the dashed line positions 12a and 12b, the motors controlling the drive means 22 under the vehicle are all rotating at the same speed at any instant of time according to FIG. 3A at time $t_1$. In this manner, the vehicle experiences substantially no thrust bucking or jerking as it moves through the zone and is slowed to a final speed $V_L$ corresponding to the station speed as determined by the frequency $f_L$.

When a next vehicle 12 enters the deceleration zone it also energizes switch 36a which functions to advance the switch 32a to position B and the three-phase stator windings for motor 24a are connected to RGI 28 via the SB switches. In the same manner as for the previous vehicle, all of the motors 24 are sequentially switched to RGI 28 as the vehicle advances and its speed changed according to FIG. 3A. The next vehicle entering the zone is assigned to the control of RGI 30 by the advancement of switch 32a to position C and all such switches 32b, 32c, etc. are advanced to position C as the vehicle moves through the zone.

By the time another vehicle 12 enters the deceleration zone, the first vehicle assigned to RGI 26 is exiting the zone and the switching circuits 32 may again be in position to assign the new vehicle to RGI 26. It should be understood that any number of RGI's may be used depending on the type and complexity of the system and that, although three RGI's are shown here, fewer or more than three may also work in the system.

In the operation of acceleration, the vehicles are assigned to a bank of ramp-generator/inverters that apply motor speed control according to FIG. 3B and the switching is accomplished in much the same way as herebefore described with reference to decelerating a vehicle.

In FIG. 5, a logic switching circuit 34 is shown wherein a trigger pulse is initiated by the presence of a vehicle on line 38 from a sensor 36a' located within the pathway. The presence of a first trigger pulse establishes a logic state such that an output signal is presented on line 40 that sets the state of triac switches SA' for connection of the motor stator windings to RGI 26. As the vehicle advances, a plurality of logic switching circuits 34a, 34b, etc. connects all motors 24a, 24b, 24c, etc. to RGI 26. When a next vehicle triggers a pulse for each logic circuit 34a, 34b, etc. the state of the logic is such that an output signal is presented on line 42 and all motors are connected to RGI 28 via triac switches SB'. In the same manner, a next vehicle initiates logic switching to establish an output on line 44 and connection of all motors to RGI 30 via triac switches SC'.

In the preferred form of the invention, polyphase electric motors are cited and these may be either synchronous or induction motors. In the use of either type motor, speed changes may be effected by varying the frequency of the applied stator signals. There are known advantages and disadvantages in the use of each type motor. For example, more precise speed control is afforded by the use of synchronous motors resulting in accurate spacing of the vehicles 12. Since all motors associated with a particular RGI and vehicle are rotating at the same synchronous speed at any instant of time, a pile up of vehicles at the low speed end of the deceleration zone or alternately at the high speed end of the acceleration zone is not likely. In the use of induction motors in a passenger conveying system, any amount of rotor slip would not be tolerated because vehicle spacing could not be maintained. In other conveying systems not designed for passenger traffic, vehicle bumping would not be objectionable and induction motors may be used. An alternative solution for passenger systems would be to increase the vehicle spacing such that at maximum slip a minimum safe distance between vehicles within the zone may be maintained. The ultimate choice of motor will depend upon the characteristics desired for the particular installation and it is considered within the knowledge of persons skilled in the art to apply the teachings of the instant invention to the use of either synchronous or induction motors.

Although in some applications, it may be advantageous that all of the motors are of the same type, and controllable over the total speed range, i.e., from $V_H$ to $V_L$ or visa versa, it is not a requirement imposed on the system. For example, FIG. 3A illustrates the case wherein each motor has a different synchronous speed depending upon its position within the zone. In this circumstance, motor 24a has a synchronous speed $V_H$ at the top of the deceleration zone (or alternately $V_L$ at the bottom of the acceleration zone) and decreases in speed to $V_z$ while the associated drive means 22 is in contact with the vehicle 12. When the vehicle passes the position of motor 24a, its contact with the drive means ceases and the switch 36a is open-circuited. Motor 24a is now at speed $V_z$ and it is not necessary to take it down to speed $V_L$. The next succeeding vehicle entering the zone closes switch 36a to couple another RGl on-line and motor 24a is brought back up to synchronous speed $V_H$ in preparation to accept the vehicle. In this arrangement, it is only necessary to vary the speed of motor 24a between $V_H$ and $V_z$. In the same manner, each succeeding motor covers a limited speed range according to its position within the zone, i.e., motor 24b has a range $V_y - V_x$, motor 24c has a range of $V_w - V_u$, etc. In the embodiment shown, four motors are under a vehicle while it is within the zone and as illustrated in FIG. 3A at time $t_i$, motors 24a, 24b, 24c, and 24d all have the same speed $V_i$ as reflected in the stator signal frequency $f_i$. Although four motors are shown under a vehicle, more or fewer than four may be used depending upon the length of the vehicle, the distance between motor-drive sets, and the switching speed of the system.

While certain representative embodiments and details have been shown for the purpose of illustrating the invention, it will be apparent to those skilled in the art that various changes and modifications may be made therein without departing from the spirit or scope of the invention.

What is claimed is:

1. A speed control system for vehicles traversing a pathway comprising:
   a. a plurality of polyphase electric motors in relative spaced apart position along the pathway;
   b. means coupled to said motors to rotate in speed synchronism therewith and positioned within the pathway to provide driving engagement with said vehicles;
   c. a source of three-phase variable-frequency control signals; and
   d. circuit means operatively connecting said motors to the source of control signals such as to connect said motors in sequence to the source as a vehicle advances along the pathway and provide a changing speed characteristic to the vehicle 2. The control system of claim 1, wherein a plurality of sources for three-phase variable-frequency control signals are provided and the circuit means sequentially connects the motors to one of the plurality of sources for a particular vehicle and to another of the sources for the next successive vehicle.

3. The control system of claim 1, wherein the circuit means comprises:
   a. means along the track operatively positioned for activation by a passing vehicle to provide a signal output in the presence of a vehicle; and
   b. switching circuit means operatively connected to accept the activation signal to provide circuit coupling of the source of three-phase variable-frequency signals to the plurality of motors.

4. The control system of claim 3, wherein a plurality of sources for three-phase variable-frequency control signals are provided and a vehicle activating means and switching circuit means are provided for each motor along the path to sequentially connect the motors to any one of the plurality of sources as determined by the state of the switching circuit means when energized by the signal from the vehicle activating means.

5. The control system of claim 4, wherein the means activated by a vehicle is an electronic sensor that outputs a pulse signal in the presence of a vehicle and the switching circuit means is a solid state logic switching circuit.

6. The control system of claim 4, wherein the means activated by a vehicle is an electromechanical switch and the switching circuit means is a stepping switch that advances its position in response to the state of the electromechanical switch.

7. The control system of claim 1, wherein the means providing driving engagement with the vehicles are bands of friction material.

8. In a transportation system for vehicles traversing a pathway, acceleration and deceleration speed control apparatus comprising:
   a. means within the pathway for engagement with the vehicles;
   b. a plurality of polyphase electric motors coupled to the vehicle engaging means to effect rotation of the means at the synchronous speeds of the motors;
   c. a plurality of sources of three-phase variable-frequency signals to provide motor speed control according to the time rate of change of frequency; and
   d. switching circuit means connecting each of said plurality of motors to each of said plurality of sources and activated by said vehicles to sequentially connect all of said motors to a single source for a particular vehicle as it advances within the pathway and to connect all of said motors to another of said sources for the next following vehicle.

9. The apparatus of claim 8, wherein the switching circuit means comprises solid state logic switching circuits associated with each of said motors to sequentially connect the motors to any one of the plurality of sources as determined by the state of the logic when activated by a particular vehicle.

10. The apparatus of claim 8, wherein the polyphase electric motors are synchronous motors.

11. The apparatus of claim 8, wherein the polyphase electric motors are induction motors.

12. In a transportation system for passenger vehicles traversing a pathway, acceleration and deceleration speed control apparatus comprising:
   a. a plurality of rubber-tired wheels positioned within the pathway for driving engagement with the vehicles;
   b. a like plurality of synchronous motors coupled to the wheels to effect rotation thereof in speed synchronism with the motors;
   c. a plurality of sources of three-phase variable-frequency signals to provide motor speed control according to the time rate of change of the signal frequency; and
   d. switching circuit means connecting each of said plurality of motors to each of said signal sources and activated by said vehicles to sequentially connect all of said motors to a single source for a particular vehicle as it advances within the pathway and to connect all of said motors to another of said sources for the next successive vehicle.

13. A method of controlling the speed of a vehicle moving along a pathway comprising the steps of:

A. positioning a plurality of polyphase electric motors in spaced apart relation relative to the pathway;
B. coupling an equal plurality of drive means to the motors such that rotation of the drive means effects control of the vehicle when in engagement therewith;
C. supplying three-phase variable-frequency control signals to the plurality of motors; and
D. sequentially connecting the motors in advance of a vehicle to the control signals to effect a changing speed characteristic to the vehicle according to the time rate of change of frequency of the control signals.

14. a method of accelerating or decelerating a vehicle traversing a pathway wherein a plurality of vehicle-engaging means are positioned within the pathway and coupled to a like plurality of synchronous motors effecting rotation thereof at the synchronous speed of the motors, the method comprising the steps of:
A. supplying three-phase variable-frequency currents to the motor stator windings; and
B. sequentially connecting each motor along the pathway to the source of variable-frequency currents as the vehicle advances within the pathway and effecting a changing speed characteristic to the vehicle according to the time rate of change of frequency.

15. The method of claim 14, wherein the three-phase variable-frequency currents are supplied from a plurality of sources and all of said motors are switched sequentially to a particular source for a single vehicle while the next succeeding vehicle effects switching connection of the motors to another of the sources.

* * * * *